(12) United States Patent
Springer et al.

(10) Patent No.: US 7,099,995 B2
(45) Date of Patent: Aug. 29, 2006

(54) METADATA ACCESS DURING ERROR HANDLING ROUTINES

(75) Inventors: James A. Springer, Tucson, AZ (US); Yu-Cheng Hsu, Tucson, AZ (US); Gilad Sharaby, Hamovil, IL (US); Aaron S. Mahar, Tucson, AZ (US); Angelique R. Budaya, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 10/781,200

(22) Filed: Feb. 17, 2004

(65) Prior Publication Data

US 2005/0193230 A1 Sep. 1, 2005

(51) Int. Cl.
*G06F 12/00* (2006.01)

(52) U.S. Cl. .................. 711/114; 711/137; 712/207

(58) Field of Classification Search .............. 711/112, 711/114, 137; 712/205, 207, 233
See application file for complete search history.

(56) References Cited

U.S. PATENT DOCUMENTS

| | | | |
|---|---|---|---|
| 3,611,314 A | 10/1971 | Pritchard et al. | |
| 4,449,182 A | 5/1984 | Rubinson et al. | |
| 5,623,608 A * | 4/1997 | Ng | 711/137 |
| 5,745,730 A | 4/1998 | Nozue et al. | |
| 5,867,685 A | 2/1999 | Fuld et al. | |
| 6,047,001 A | 4/2000 | Kuo et al. | |
| 6,061,768 A | 5/2000 | Kuo et al. | |
| 6,516,389 B1 * | 2/2003 | Uchihori | 711/137 |
| 6,557,083 B1 | 4/2003 | Sperber et al. | |
| 6,584,513 B1 | 6/2003 | Kallat et al. | |
| 2002/0169927 A1 | 11/2002 | Takai | |
| 2005/0138195 A1 * | 6/2005 | Bono | 709/231 |

OTHER PUBLICATIONS

IBM Technical Disclosure Bulletin (1994) 37(10):681.

* cited by examiner

*Primary Examiner*—Nasser Moazzami
(74) *Attorney, Agent, or Firm*—Dan Shifrin

(57) ABSTRACT

A data storage control unit is coupled to one or more host devices and to one or more physical storage units. Data is stored in one of the storage units and, for data integrity, copied to another storage unit. An updated state of the copy process (metadata) is maintained and updated in metadata tracks in a memory of the storage controller and periodically destaged to corresponding metadata tracks of a storage unit. If the copy process is interrupted, such as by a power failure, an error handling routine commences. Track state fields associated with each in-memory metadata track are initialized to an 'invalid' state and background staging of metadata tracks from the storage unit to the memory. After a track is staged, the associated track state field is changed to a 'valid' state. If a request is received to access a track of copy state data and the track has been staged (as indicated by the state of the associated track state field), the track is accessed. If the requested track has not been staged, requester waits while the requested track is staged; then the requested track is accessed. Once the error handling routine is completed, normal I/O operations with customer data may resume. Preferably, completion of the error handling routine is independent of the completion of the staging of copy state data tracks.

22 Claims, 3 Drawing Sheets

METADATA ACCESS DURING ERROR HANDLING ROUTINES

TECHNICAL FIELD

The present invention relates generally to backup and disaster recovery services for a data storage system and, in particular, to improving the efficiency of error handling routines following the interruption of a data copy operation.

BACKGROUND ART

High end storage controllers, such as the International Business Machines Corporation (IBM®) Enterprise Storage Server® manage Input/Output (I/O) requests from networked hosts to one or more storage units, such as a direct access storage device (DASD), Redundant Array of Independent Disks (RAID Array), and Just a Bunch of Disks (JBOD). Storage controllers include one or more host bus adapters or interfaces to communicate with one or more hosts over a network and adapters or interfaces to communicate with the storage units.

Data integrity is a critical factor in large computer data systems. Consequently, backup systems have been developed and integrated into storage controller to prevent the loss of data in the event of various types of failures. Backup systems provided by IBM, known generally as "copy services", include Peer-to-Peer Remote Copy, FlashCopy® and Extended Remote Copy and maintain a separate, consistent copy of customer data. As illustrated in FIG. 1, in a storage system 100, data generated by a host device 110 is transmitted to a primary storage unit 120 for storage on associated storage devices 130. A copy of the data is also transmitted, such as over a fibre channel network 140, and to a secondary storage unit 150 for storage on associated storage devices 160. Because of the flexibility of network interconnections, the primary and secondary units 120 and 150 may be physically located remote from the host 110. And, for additional data security, the primary and secondary units 120 and 150 may be (but need not be) physically located distant from each other, thereby reducing the likelihood of a single disaster simultaneously harming both the primary and secondary units 120 and 150. It will be appreciated that the primary and secondary units 120 and 150 may be the same physical unit, divided logically into two.

Due at least in part to the risk of a power loss or other comparable significant event while customer data is being copied to the secondary unit, the state of the copy services operation is stored in memory and updated as the copy services operation progresses. The state data (as well as other control information used internally by the storage controller), known as "metadata", is periodically destaged from the memory to reserved areas of the customer storage devices 130. Preferably, the metadata is divided into tracks of, for example, 8 KB each. There may be as many as 2000 or more such tracks.

During an error handing routine or behavior (EHB), such as an internal microcode load (IML), following a power loss during a copy services operation or other comparable significant event, the metadata is staged from the storage device to the memory where it becomes available for the recovery operation. In a conventional EHB, other EHB activities must be paused while all of the metadata tracks are staged to memory. Only after all of the metadata has been staged may the EHB be completed and normal customer I/O operations resumed. Consequently, the requirement to stage all of the metadata tracks delays completion of the EHB and adversely impacts customer I/O.

Consequently a need remains for improving the performance of metadata recovery during EHB activities without adversely affecting customer operations.

SUMMARY OF THE INVENTION

The present invention provides a method for initializing a data storage controller. Following commencement of an IML, copy state data tracks are background staged from a disk storage device to a memory device. If a request is received to access a track of copy state data and the track has been staged, the track is accessed. If the requested track has not been staged, requester waits while the requested track is staged; then the requested track is accessed. Preferably, completion of the IML is independent of the completion of the staging of copy state data tracks.

The present invention further provides methods for processing metadata in a storage controller. During a copy services operation, the current state of the operation is maintained in a memory device. Periodically, the current state is destaged to metadata tracks on a storage device. Following commencement of an error handling routine, copy state data tracks are background staged from a disk storage device to a memory device. If a request is received to access a track of copy state data and the track has been staged, the track is accessed. If the requested track has not been staged, the requester waits while the requested track is staged; then the requested track is accessed. Preferably, completion of the error handling routine is independent of the completion of the staging of copy state data tracks.

The present invention further provides a data storage controller, including a memory device for storing a current state of a copying operation as metadata tracks and means for processing an error handling routine. The means for processing an error handling routine includes means for initializing a parameter of each metadata track to a first state, means for commencing background staging of the metadata tracks and means for changing the state of the parameter to a second state when a track is staged. If a request is received to access a track of copy state data and the corresponding parameter indicates that the track has been staged, the track is accessed. If the corresponding parameter indicates that the requested track has not been staged, the requester waits while the requested track is staged; then the requested track is accessed. Completion of the error handling routine is independent of the completion of the staging of copy state data tracks.

The present invention further provides a copy services component of a data storage controller, including means for processing error handling routines. The means for processing error handling routines includes means for initializing a parameter of each metadata track to a first state, means for commencing background staging of the metadata tracks and means for changing the state of the parameter to a second state when a track is staged. If a request is received to access a track of copy state data and the corresponding parameter indicates that the track has been staged, the track is accessed. If the corresponding parameter indicates that the requested track has not been staged, the requester waits while the requested track is staged; then the requested track is accessed. Completion of the error handling routine is independent of the completion of the staging of copy state data tracks.

The present invention further provides a data structure in a memory of a data storage controller, including a first field for storing a portion of a current state of an active copy operation, the portion being periodically destaged to a storage device. The data structure further includes a track state field having a first state indicative of invalid contents in the first field and a second state indicative of valid contents in the first field. Following commencement of an error handling operation, a background staging commences of the first field from the storage device to a memory device. When a request is received to access the first field, if the first field has been staged, access is allowed to the first field. If the first field has not been staged, a wait command is issued in response to the request to access the first field, the first field is staged, the wait command is revoked and the first field is accessed.

The present invention further provides a computer program product having computer-readable for initializing a storage controller. The computer-readable code includes instructions for commencing an IML, background staging copy state data tracks from a disk storage device to a memory device. If a request is received to access a track of copy state data and the track has been staged, the track is accessed. If the requested track has not been staged, requester waits while the requested track is staged; then the requested track is accessed. Preferably, completion of the IML is independent of the completion of the staging of copy state data tracks.

DETAILED DESCRIPTION OF THE PREFERRED EMBODIMENT

Figure 1:
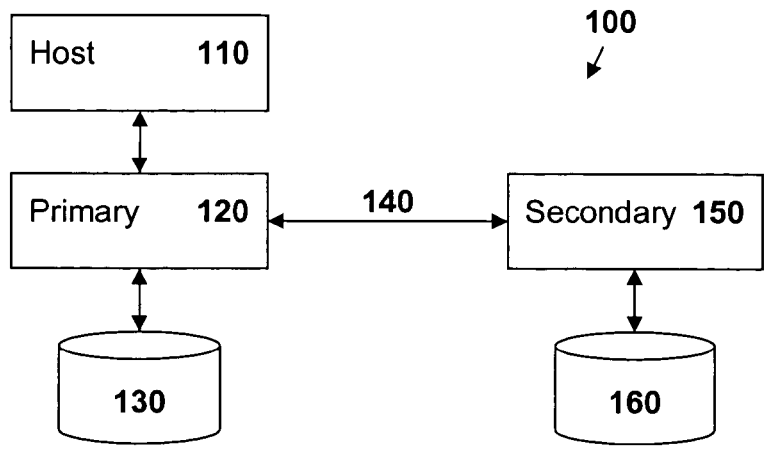
FIG. 1 is a block diagram of a data storage system in which the present invention may be implemented.
Figure 2:
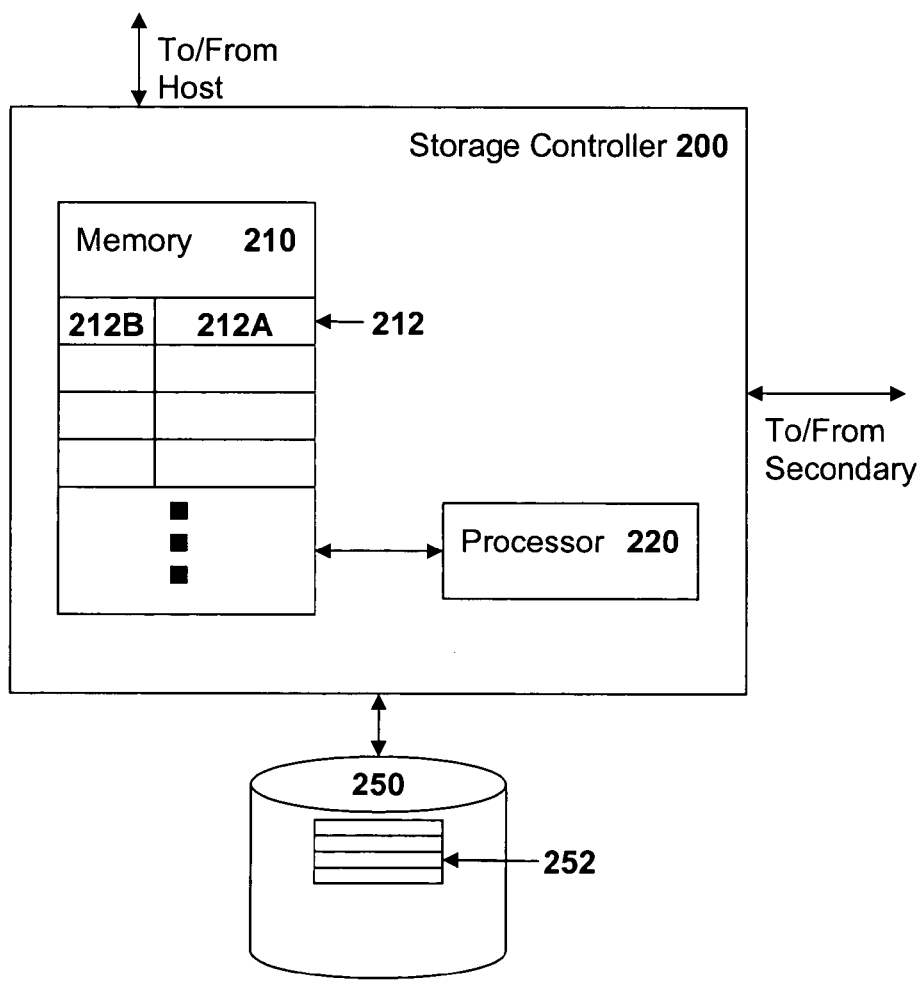
FIG. 2 is a block diagram of a storage controller in which the present invention may be implemented.

FIG. 2 is a block diagram of a primary data storage controller 200 in which the present invention may be implemented. The controller 200 is coupled through appropriate adapters or interfaces to one or more host devices and to one or more physical storage units 250, such as disk storage devices, and to a secondary storage controller. The controller 200 includes a memory device 210 and a processor 220.

The memory 210 includes an area in which metadata tracks 212 are stored. A first part 212A of each metadata track 212 is allocated to storing the current state of a copy services operation. A second part of each in-memory metadata track 212 is allocated to a track state field 212B. As will be described, each track state field 212B contains a flag whose state (staged (valid) or unstaged (invalid)) is indicative of the status of the metadata in the corresponding first part 212A of the track 212.

Similarly, the attached storage device 250 includes an area in which copies 252 of the metadata tracks are stored in a non-volatile manner.

Figure 3:
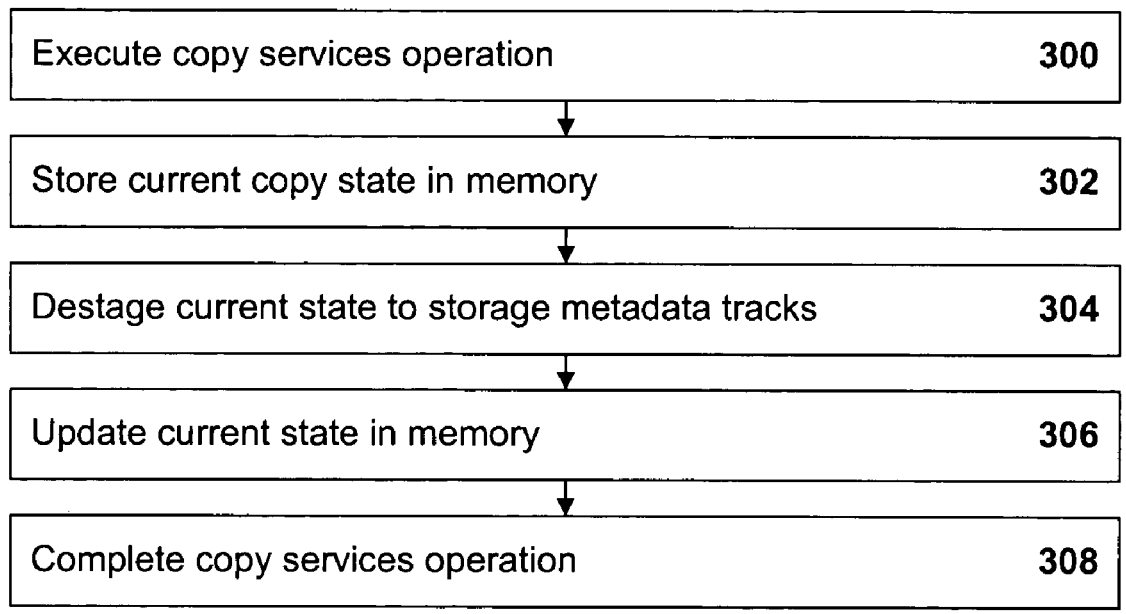
FIGS. 3 and 4 are flow charts of one implementation of the present invention.

Referring also to the flow chart of FIG. 3, an implementation of the present invention will be described, under the control of program instructions executed in the processor 220. A copy services operation (such as a Peer-to-Peer Remote Copy, a FlashCopy® or an Extended Remote Copy) commences (step 300) to copy customer data from the primary storage controller 120 to the secondary storage controller 150. The details of such copy operations are known in the art and covered by other IBM patents and will not be described herein. The current state of the copy services operation is stored as part of metadata 212 in the memory 210 (step 302). Periodically, the current state is destaged from the memory 210 to metadata tracks 252 in the storage device 250. Such destaging may occur, for example, at regular time intervals, when the copy state is updated (step 306) or at other designated times. Eventually, the copy services operation is completed (step 308).

Figure 4:
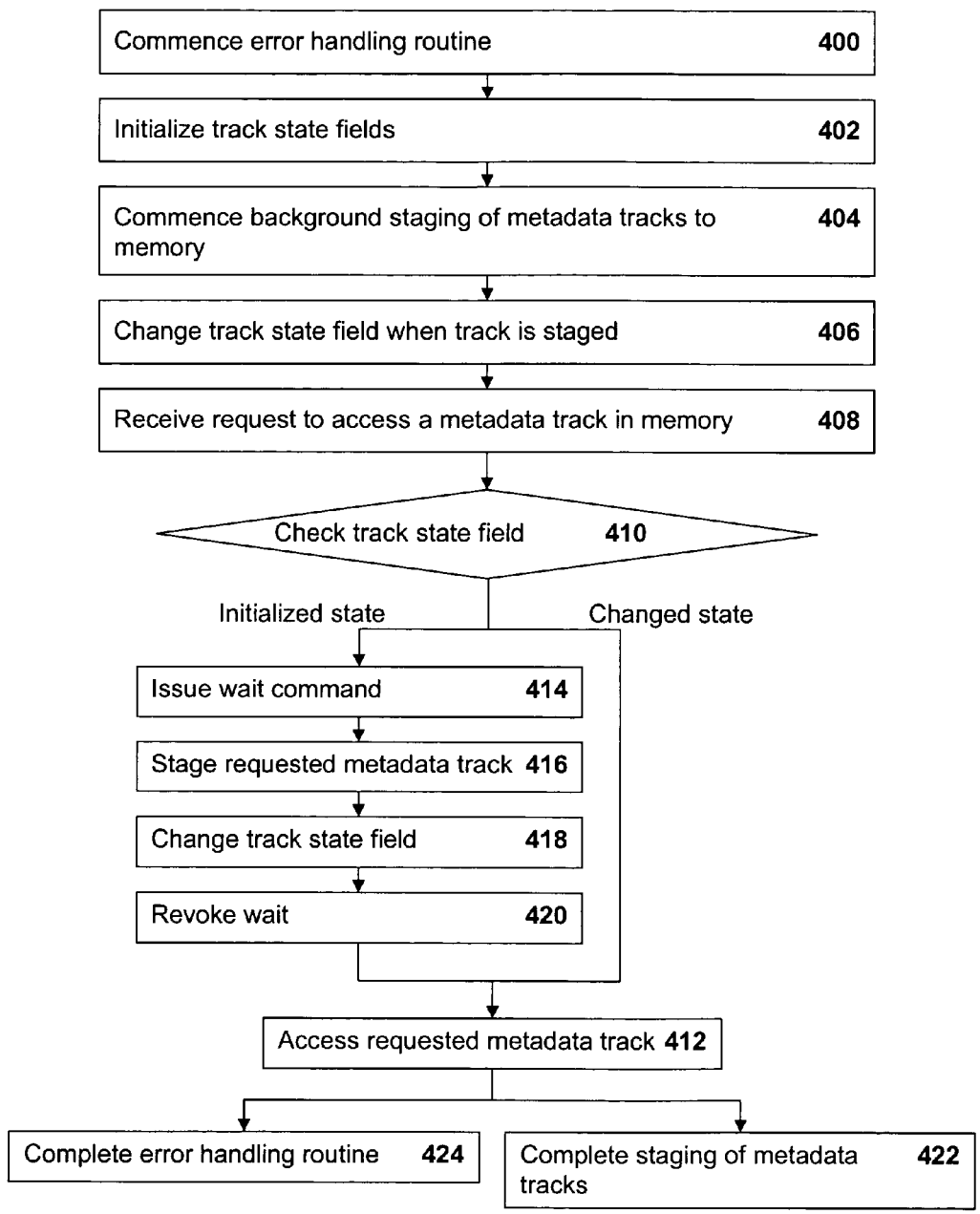

As noted above, there are circumstances, such as a power failure, software bug, hardware failure or other comparable significant event, which interrupt a copy services operation and prevent its completion. Rather than re-start the operation from the beginning, further delaying normal operation of the storage system, an error handling routine is initiated (FIG. 4, step 400). The error handling routine, also known as error handling behavior (EHB), may include an initial microcode load (IML). The track state fields 212B of the in-memory metadata tracks 212 are initialized to a first of two states (step 402) indicating that the contents of the first part 212A of each track 212 (the part in which the copy state information is stored) is 'invalid'. Next, staging of the metadata tracks 252 from the storage device 250 to the memory 210 is begun (step 404). However, in contrast to conventional error handling routines, in the present invention the metadata tracks are staged in the background, without interrupting or otherwise delaying other aspects of the error handling routine, thus increasing the speed with which normal operations of the storage system may resume. When a metadata track 252 has been staged to the first part 212A of an in-memory track 212, the associated track state field 212B is changed to 'valid' (step 406) and a next track is staged.

Copy state information contained in the metadata tracks may need to be accessed during the error handling routine. If a request for a track is received (step 408), the track state field 212B of the requested track is examined (step 410). If the field 212B is in the 'valid' state, indicating that the metadata contents of the first part 212A have been staged from the storage device 250, access to the contents is allowed (step 412). However, if the field 212B is in the 'invalid' state, indicating that the metadata contents of the first part 212A have not yet been staged from the storage device 250, access to the contents is not allowed. Instead, a 'wait' command is issued (step 414), and the requested track is staged to the memory 210 out of sequence (step 416). Once staged, the track state field is changed to 'valid' (step 418), the 'wait' command is revoked (step 420) and access is allowed (step 412).

During the subsequent staging of the remaining metadata tracks 252 (step 422), any track which has previously been staged out of sequence, as indicated by the 'valid' state of the track state field, will be skipped as re-staging is unnecessary.

The error handling routine may continue to completion (step 424) without waiting for the staging of metadata tracks to complete (step 422). Thus, completion of the error handling routine and completion of staging the metadata tracks proceed independent of each other and normal customer I/O operations may commence as soon as the error handling routine is completed.

The described techniques may be implemented as a method, apparatus or computer program product using standard programming and/or engineering techniques to produce software, firmware, hardware, or any combination thereof. The computer program product (such as the operating memory 138), as used herein, refers to code or logic implemented in hardware logic (e.g., an integrated circuit chip, Programmable Gate Array (PGA), Application Specific Integrated Circuit (ASIC), etc.) or a computer readable medium (e.g., magnetic storage medium such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed as instructions by a processor. The code in which implementations are made may further be accessible through a transmission media or from a file server over a network. In such cases, the computer program product in which the code is implemented may comprise a transmission media such as network transmission line, wireless transmission media, signals propagating through space, radio waves, infrared signals, etc. Of course, those skilled in the art will recognize that many modifications may be made to this configuration without departing from the scope of the implementations and that the computer program product may comprise any information bearing medium known in the art.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for initializing a storage controller, comprising:
   commencing an initial microcode load (IML) operation;
   initializing a parameter in a field of the tracks of copy state data to a first state;
   commencing background staging of copy state data tracks from a disk storage device to a memory device;
   changing the state of the parameter of a track to a second state;
   receiving a request to access a track of copy state data;
   if the requested track of copy state data has been staged and the parameter is in the state, accessing the requested track of copy state data;
   if the requested track of copy state data has not been staged and the parameter is in the first state;
     issuing a wait command in response to the request to access the track of copy state data;
     staging the requested track of copy state data;
     revoking the wait command; and
     accessing the requested track of copy state data;
   completing the staging of the copy state data tracks; and
   completing the IML.

2. The method of claim 1 wherein completion of the IML is independent of completion of the staging of all copy state data tracks.

3. A method for processing metadata in a data storage controller, comprising:
   executing a copy service operation;
   maintaining a current state of the copy services operation in a memory device;
   periodically destaging the current state of the copy services operation from the memory device to a plurality of metadata tracks on a storage device;
   following commencement of an error handling routine, commencing background staging of the metadata tracks from the storage device to the memory device;
   receiving a request to access a metadata track;
   if the requested metadata track has been staged, allowing access to the requested metadata track;
   if the requested metadata track has not been staged;
     issuing a wait command in response to the request to access the metadata track;
     staging the requested metadata track;
     revoking the wait command; and
     accessing the requested metadata track;
   completing the staging of the metadata tracks; and
   completing the error handling routine.

4. The method of claim 3, further comprising
   initializing a parameter in a field in each of the metadata tracks to a first state when the error handling routine is commenced; and
   changing the state of the parameter of a metadata track to a second state when the metadata is staged to the memory device.

5. The method of claim 4, further comprising, when the request to access the metadata track is received:
   if the parameter is in the second state, allowing access to the requested track; and
   if the parameter is in the first state;
     staging the requested track; and
     allowing access to the requested track.

6. The method of claim 3, wherein the error handling routine is an initial microcode load.

7. The method of claim 3, wherein completion of the error handling routine is independent of completion of the staging of metadata.

8. A method for processing metadata in a data storage controller, comprising:
   executing a copy service operation;
   maintaining a current state of the copy services operation in a memory device;
   periodically destaging the current state of the copy services operation from the memory device to a plurality of metadata tracks on a storage device;
   following commencement of an error handling routine, initializing a parameter in a field of each of the metadata tracks to a first state;
   commencing background staging of the metadata tracks from the storage device to the memory device;
   changing the state of the parameter of a metadata track to a second state when the metadata track is staged to the memory device,
   receiving a request to access a metadata track;
   if the parameter is in the second state, allowing access to the requested metadata track;
   if the parameter is in the first state;
     issuing a wait command in response to the request to access the metadata track;
     staging the requested metadata track;
     revoking the wait command; and
     allowing access to the requested metadata track; and
   completing the error handing routine.

9. The method of claim 8, wherein the error handing routine is an initial microcode load.

10. The method of claim 8, wherein completing the error handling routine is independent of completion of the staging of metadata tracks.

11. A storage controller, comprising:
   means for receiving customer data from a host device;
   means for storing the customer data onto a first storage device;
   means for copying the customer data onto a second storage device in a copying operation;
   a memory device for storing a current state of the copying operation as a plurality of metadata tracks;
   means for periodically destaging the metadata tracks to a selected one of the first and second storage devices; and
   means for processing an error handling routine following an interruption in the copying operation, comprising;
     means for initializing a parameter of each metadata track in the memory device to a first state;
     means for commencing background staging of the metadata tracks from the selected storage device to the memory device;
     means for changing the state of the parameter of a metadata track to a second state when the metadata track is staged to the memory device;
     means for receiving a request to access a metadata track;

means for allowing access to the requested metadata track if the parameter of the requested metadata track is in the second state;

if the parameter of the requested metadata track is in the first state;

means for issuing a wait command in response to the request to access the metadata track;

means for staging the requested metadata track to the memory device;

means for revoking the wait command; and means for allowing access to the requested metadata track; and means for completing the error handling routine.

12. The storage controller of claim 11, wherein the error handling routine is an initial microcode load.

13. The storage controller of claim 11, wherein the means for completing the error handling routine comprises means for completing the error handling routine independent of completion of the staging of metadata tracks.

14. A copy services component of a data storage controller the copy services component comprising:

means for directing that customer data be copied onto a storage device in a copy operation;

a plurality of data structures for collectively maintaining a current state of the copy operation;

an interface through which copies of the data structures are periodically destaged to the storage device;

means for processing an error handling routine following an interruption in the copy operation, comprising;

means for initializing a parameter of each metadata track in the memory device to a first state;

means for commencing background staging of the metadata tracks from the selected storage device to the memory device;

means for changing the state of the parameter of a metadata track to a second state when the metadata track is staged to the memory device, means for receiving a request to access a metadata track;

means for allowing access to the requested metadata track if the parameter of the requested metadata track is in the second state;

if the parameter of the requested metadata track is in the first state;

means for issuing a wait command i response to the request to access the metadata track;

means for staging the requested metadata track to the memory device;

means for revoking the wait command; and means for allowing access to the requested metadata track; and means for completing the error handling routine.

15. The copy services component of claim 14, wherein the error handling routine is an initial microcode load.

16. The copy services component of claim 14, wherein the means for completing the error handling routine comprises means for completing the error handling routine independent of completion of the staging of metadata tracks.

17. A data structure stored in a memory of a data storage controller, the storage controller coupled to a first storage device storing customer data and to a second storage device staring a copy of the customer data, the data structure comprising:

a first field for storing a portion of a current state of an active copy operation, the portion being periodically destaged to one of the first and second storage devices; and a track state field having a first state indicative of invalid contents in the first field and a second state indicative of valid contents in the first field;

wherein:

following commencement of an error handling routine, a background staging commences of the track from the storage device to the memory device;

when a request is received to access the first field:

if the first field has been staged, access is allowed to the track;

if the first field has not been staged:

a wait command is issued in response to the request to access the first field;

the first field is staged;

the wait command is revoked; and the first field is accessed; and the error handling routine is completed.

18. The data structure of claim 17, wherein further:

the track state field is initialized to the first state when the error handling routine is commenced; and the state of the track state field is changed to the second state when the first field is staged to the memory device.

19. The data structure of claim 18, wherein further, when the request to access a track is received:

if the track state field is in the second state, access to the first field is allowed; and if the track state field is in the first state:

the first field is staged; and access to the first field is allowed.

20. The data structure of claim 17, wherein further completion of the error handling routine is independent of completion of the staging of other data structures.

21. A computer program product of a computer readable medium usable with a programmable computer the computer program product having computer-readable code embodied therein for initializing a storage controller, the computer-readable code comprising instructions for:

commencing an initial microcode load (IML) operation;

initializing a parameter in a field of the tracks of copy state data to a first state;

commencing background staging of copy state data tracks from a disk storage device to a memory device;

changing the state of the parameter of a track to a second state;

receiving a request to access a track of copy state data;

if the requested track of copy state data has been staged and the parameter is in the second state, accessing the requested track of copy state data;

if the requested track of copy state data has not been staged and the parameter is in the first state:

issuing a wait command in response to the request to access the track of copy state data;

staging the requested track of copy state data;

revoking the wait command; and accessing the requested track of copy state data;

completing the staging of the copy state data tracks; and completing the IML.

22. The computer program product of claim 21, wherein completion of the IML is independent of completion of the staging of all copy state data tracks.

* * * * *